Feb. 22, 1966   J. E. PHILLIPS   3,236,912
DISPROPORTIONATION-ALKYLATION PROCESS
Filed Dec. 2, 1963   2 Sheets-Sheet 1

INVENTOR.
J. E. PHILLIPS
BY
ATTORNEYS

United States Patent Office  3,236,912
Patented Feb. 22, 1966

3,236,912
DISPROPORTIONATION-ALKYLATION PROCESS
Jack E. Phillips, Bartlesville, Okla., assignor to Phillips Petroleum Company, a corporation of Delaware
Filed Dec. 2, 1963, Ser. No. 327,393
4 Claims. (Cl. 260—683.45)

This invention relates to the manufacture of hydrocarbons. In one aspect the invention relates to a combined disproportionation, alkylation process. In another aspect the invention relates to apparatus for a combined disproportionation-alkylation operation.

In the refining of hydrocarbons to produce high octane gasoline, olefins, for example ethylene, propylene, and butene, are used to alkylate paraffins, for example isobutane, to produce high octane gasoline components. Ethylene and butene alkylation in general produce higher octane components than propylene alkylation. The overall refining operation can be improved by disproportionating propylene to produce additional amounts of ethylene and butene for alkylation.

An object of my invention is to improve the manufacture of hydrocarbons.

Another object of my invention is to produce high octane gasoline components.

Another object of my invention is to reduce the separation steps required in a combined disproportionation-alkylation operation.

Other aspects, objects, and the advantages of my invention are apparent in the written description, the drawing and the claims.

According to my invention propylene is disproportionated to produce a stream containing propylene, ethylene and butene and at least a portion of the disproportionation effluent stream, without separation of the olefin components, is contacted with isobutane in an alkylation zone.

Further according to my invention propylene is disproportionated to produce a stream containing propylene, ethylene and butene, and undivided disproportionation effluent is contacted with isobutane in a first alkylation zone under conditions to produce a first alkylation product of propylene, butene and isobutane, the effluent of the first alkylation zone is separated to produce a light stream comprising ethylene and unconverted isobutane and a heavy stream comprising the product of the first alkylation zone, at least a portion of the light stream, without separation, is passed into a second alkylation zone under conditions to produce a second alkylation product of ethylene and isobutane contained in the light stream. Further according to my invention the effluent of the second alkylation zone is separated to produce a second alkylation product and unconverted isobutane which is recycled to at least one of the alkylation zones.

Figure 1:
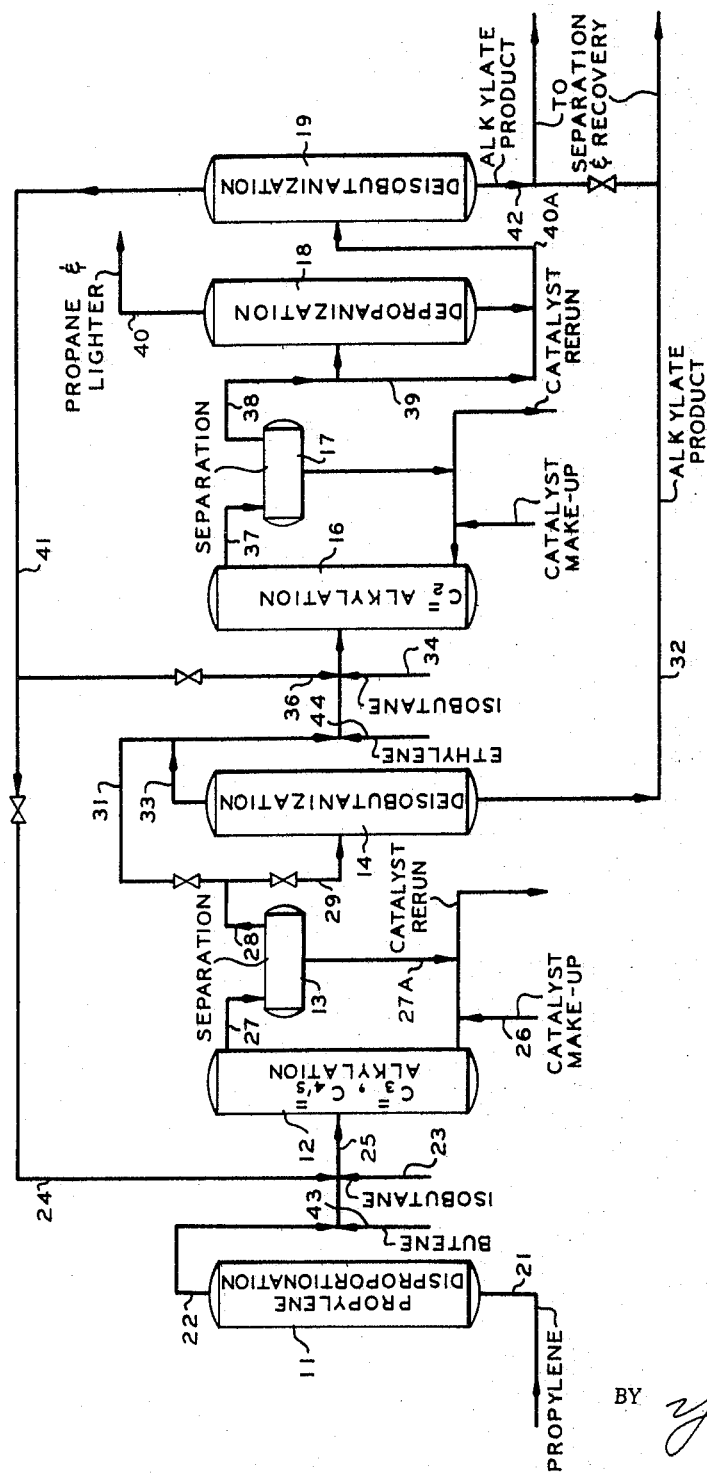
FIGURE 1 is a diagrammatic representation of apparatus for carrying out a combined disproportionation and alkylation process according to my invention.

In FIGURE 1 the apparatus comprises a disproportionation reactor 11, an alkylation contactor 12, an alkylation separator 13, a fractional distillation column 4, an alkylation contactor 16, an alkylation separator 17, and fractional distillation columns 18 and 19.

Propylene is fed through pipe 21 and the disproportionation effluent removed through pipe 22. Fresh isobutane is supplied, from a source not shown, through conduit 23 while recycle isobutane is supplied through a recycle line 24, and the combined stream passed through line 25 into alkylation contactor 12. Although the various hydrocarbon streams are shown to be combined prior to entering the contactor they can be fed separately. A suitable catalyst for propylene-butene alkylation is supplied through catalyst make-up conduit 26 and catalyst recycle conduit 27A to contactor 12. Conditions are maintained within contactor 12 such that substantially all of the propylene-butene components are reacted with the isobutane to produce a first alkylate product. The contactor product and catalyst are removed through pipe 27 to separator 13, the catalyst being removed and recycled, as noted above, through pipe 27 while the first alkylate product is passed through pipe 28 and pipe 29 into a deisobutanizer fractional distillation column 14. If desired, a portion or all of the stream in pipe 28 can be bypassed through pipe 31. When the first and second alkylate products are to be combined, further separations can be avoided by sending the combined stream through pipe 31 to alkylation contactor 16.

When the two alkylate products are to be kept separate, the stream is charged to fractional distillation column 14, a first alkylate product is removed through pipe 32, and the light stream comprising ethylene and unconverted isobutane is passed through pipe 33 to alkylation contactor 16. Fresh isobutane can be supplied through pipe 34 and recycle isobutane through pipe 36. The contactor effluent stream is passed through pipe 37 to alkylation separator 17, the hydrocarbon phase being passed through pipe 38 into fractional distillation column 18, a depropanizer. If desired, a portion can be bypassed through pipe 39 to fractional distillation column 19, a deisobutanizer. The overhead from column 18, comprising propane, is removed from the system through pipe 40 to prevent excessive buildup in the system while the bottoms product is taken through pipe 40A, together with that portion bypassed through pipe 39, to column 19. The recycled unconverted isobutane is passed through pipe 41 and returned through pipe 24 and/or pipe 36 to the appropriate alkylation contactor. The second alkylate product is removed through pipe 42. Additional butene can be supplied through pipe 43 and additional ethylene through pipe 44 if desired.

Figure 2:
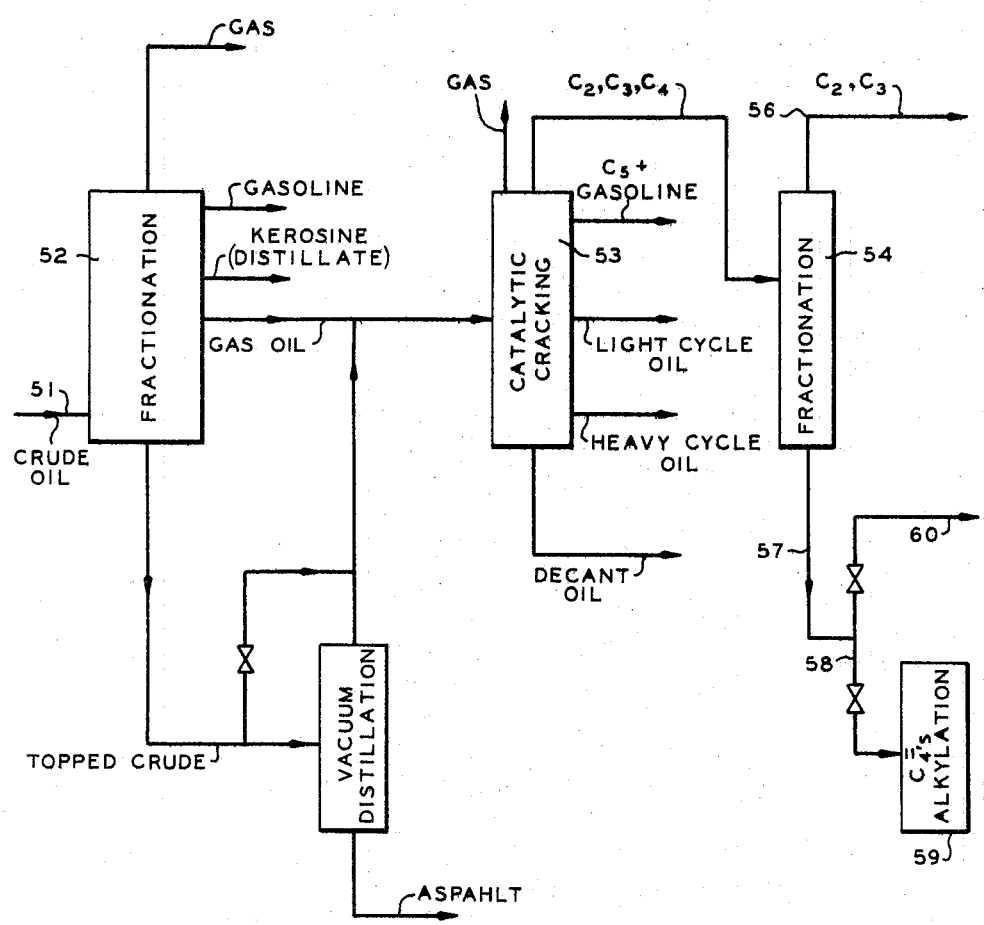
FIGURE 2 is a diagrammatic representation of a crude oil refining process which produces a stream suitable for use as a feed in the process of my invention.

In FIGURE 2 there is illustrated schematically an overall refinery operation wherein crude oil is separated and processed into the various desired streams. As shown, the crude oil stream enters through pipe 51 into fractionation apparatus indicated generally by the numeral 52. The various fractions removed include fuel gas, gasoline, kerosene (distillate), gas oil and topped crude. The gas oil, together with a portion of topped crude, if desired, and additional gas oil from vacuum distillation of the topped crude, is passed to a catalytic cracking unit 53. From this cracking unit and associated separation means an olefin stream containing ethylene, propylene, and butene is taken to a further fractionation zone 54 wherein an ethylene-propylene stream is taken overhead through pipe 56 which can be utilized as the feed to pipe 21 in FIGURE 1. The bottoms product, consisting essentially of butenes, is removed through pipe 57 and taken through pipe 58 to a butene alkylation unit 59. If desired a portion or all of the relatively pure butenes can be sent through pipe 60 which connects with pipe 43 of FIGURE 1. On the other hand, the stream through pipe 56 can be further separated to produce ethylene and propylene streams, the ethylene stream being taken to polymerization or some other process or through pipe 44 into the ethylene alkylation contactor of FIGURE 1. Of course, if the entire ethylene, propylene, butene stream is to be taken to the propylene feed line 21, the fractionation zone 54 can be eliminated. Utilizing fractionator 54 and the associated equipment including butene alkylation unit 59 together with the connection between pipe 60 and pipe 43, results in a very efficient and flexible apparatus wherein a desired octane product can be obtained either in pipe 32 and pipe 42, or pipe 42 alone depending upon the amount of butenes fed through pipe 60, the amount of material bypassed through pipe 31, and the conversion obtained in reactor 11.

In this application disproportionation is used to mean the conversion of a hydrocarbon into similar hydrocarbons or higher and lower numbers of carbon atoms per molecule. Disproportionation of olefins can be accomplished as disclosed and claimed in Serial No. 127,812, Banks, filed July 31, 1961; Serial No. 307,371, Heckelsberg, filed September 9, 1963; Serial No. 94,996, Banks, filed March 13, 1961; and the application of Banks, Serial No. 312,209, filed September 27, 1963; or by other disproportionation process, using a catalyst comprising molybdenum oxide and aluminum oxide and preferably also an oxide of cobalt on alumina, tungsten oxide on alumina, molybdenum oxide or tungsten oxide on silica or on silica alumina, tungsten carbonyl or molybdenum carbonyl on alumina, silica alumina or silica, or other variations of these catalysts, tungsten sulfide or molybdenum sulfide on alumina, or by other disproportionation catalysts, to produce the desired disproportionated product. Where the reactant comprises 1- or 2-olefins, a mixture of new products is obtained comprising primarily olefins, some having a larger and some a smaller number of carbon atoms per molecule in the feed, and also including some other disproportionated products. Conditions can be controlled to obtain a very high efficiency of conversion to desired disproportionation products. For example, propylene can be consistently converted to ethylene and butenes with an efficiency above 95 percent. One specific catalyst suitable for the practice of my invention comprises an oxide of aluminum promoted by an oxide of molybdenum and, preferably, additionally promoted by an oxide of cobalt. Suitable supports include 100 percent alumina, silica alumina wherein the amount of silica is up to about 25 percent of the total support, magnesia alumina wherein the amount of magnesia is up to about 20 percent of the total support, and titania alumina wherein the amount of titania is up to about 85 percent of the total support. The amount of molybdenum oxide or tungsten oxide is in the range of 0.5 to 30 percent by weight of the total catalyst composition, preferably 1 to 15 percent. Cobalt oxide can be present in the molybdenum promoted catalyst in the range of 0 to 20 percent by weight of the total catalyst, preferably 1 to 5 percent. Excellent results with high conversion have been obtained with molybdenum oxide in the range of 4 to 13 percent by weight of the total catalyst.

Using a molybdenum oxide or tungsten oxide catalyst supported on alumina, temperatures in the range of 150 to 500° F., preferably 250 to 400° F., can be used, and pressures in the range of 0 to 1500 p.s.i.g., for example.

The propylene-butene alkylation can be accomplished using concentrated hydrofluoric acid or other suitable alkylation catalyst, or even a thermal alkylation process. Suitable processes are described in detail for example in U.S. 3,078,321, and other patents.

The following example illustrates the practice of my invention but of course is not necessarily to be taken as establishing limitations of the process.

EXAMPLE

In an example according to my invention a stream separated from the effluent of a gas oil catalytic cracking operation and containing propylene as well as ethylene, ethane, propane and isobutane, is fed into disproportionation reactor 11. Contact is made in reactor 11 with a catalyst comprising 12.8 weight percent $MoO_3$, 3.8 weight percent CoO, and 83.4 weight percent $Al_2O_3$, at a temperature of 325° F. and a pressure of 450 p.s.i.a. and a weight hourly space velocity of 8. The effluent from reactor 11 is combined with additional quantities of isobutane supplied through pipes 23 and 24 and passed into alkylation contactor 12 where it is contacted with a hydrogen fluoride catalyst at a temperature of 85° F., a pressure of 125 p.s.i.g., and HF/hydrocarbon volume ratio of 1:1 and an average contact time of two minutes. The effluent is separated in separator 13 and the hydrocarbon phase passed into deisobutanizer 14. Deisobutanizer 14 is operated at a top pressure of 115 p.s.i.g. and a bottom pressure of 120 p.s.i.g., a top temperature of 140° F. and a bottom temperature of 275° F. The bottoms product from deisobutanizer 14 contains a first alkylate stream which is removed through pipe 32. The overhead from deisobutanizer 14 is passed into alkylation contactor 16. In alkylation contactor 16 the temperature is maintained at 85° F., the pressure is 150 p.s.i.g., and the stream is contacted with a hydrogen fluoride-boron trifluoride catalyst comprising 86 weight percent HF and 13 weight percent $BF_3$ at a catalyst/hydrocarbon volume ratio of 7:1 and an average contact time of 10 minutes. The effluent from the contactor 16 is separated in separator 17 and the hydrocarbon phase further separated in depropanizer 18 and deisobutanizer 19, a second alkylation product being removed through pipe 42. The compositions of the various streams are given in Table I, wherein the stream numbers correspond with the pipe numbers in FIGURE 1.

Table I.—Barrels per day

| Stream | 21 | 22 | 23 | 24 | 25 | 27 | 32 | 33 | 37 | 45 | 40 | 41 | 42 |
|---|---|---|---|---|---|---|---|---|---|---|---|---|---|
| Component: | | | | | | | | | | | | | |
| Ethylene | 72 | 187 | | | 187 | 187 | | 187 | | | | | |
| Ethane | 166 | 165 | | | 165 | 166 | | 166 | 166 | 166 | | | |
| Propylene | 882 | 573 | | | 573 | | | | | | | | |
| Propane | 476 | 470 | | 60 | 530 | 538 | 2 | 536 | 541 | 481 | 60 | 60 | |
| Isobutane | 770 | 760 | 385 | 6,200 | 7,345 | 6,415 | 10 | 6,405 | 6,200 | | 6,200 | 6,200 | |
| Butylenes | | 204 | | | 204 | | | | | | | | |
| Normal Butane | | | 105 | 60 | 165 | 168 | 108 | 60 | 63 | | 63 | 60 | 3 |
| Total Alkylate [1] | | | | | | 1,320 | 1,320 | | 310 | | 310 | | 310 |
| Total | 2,366 | 2,359 | 490 | 6,320 | 9,169 | 8,794 | 1,440 | 7,354 | 7,280 | 647 | 6,633 | 6,320 | 313 |

[1] Isopentane Plus.

Throughout this application the word "butene" has been used to include 1-butene, cis and trans 2-butene and isobutene. Therefore, when the word "butene" is used it can mean one single butene or a mixture of butenes.

In the drawings which, as noted, are schematic, many elements forming a part of a commercial plant operation have been omitted. For example, substantially all of the valves and all of the pumps and instrumentation have been omitted and can be supplied readily by one skilled in the art.

Reasonable variation and modification are possible within the scope of my invention which sets forth a method and apparatus for a combined disproportionation and alkylation operation.

I claim:
1. A hydrocarbon conversion process which comprises the steps of:
 passing propylene through a disproportionation zone to produce a stream containing propylene, ethylene, and butene;

contacting isobutane in a first alkylation zone with at least a portion of undivided effluent of said disproportionation zone under conditions, including conditions of temperature and catalyst activity, to produce a first alkylation product of said propylene, said butene, and said isobutane;

separating the effluent of said first alkylation zone into a light stream comprising ethylene and unconverted isobutane and a heavy stream comprising said first alkylation product; and passing at least a portion of said light stream undivided into a second alkylation zone under conditions, including conditions of temperature and catalyst activity, to produce a second alkylation product of said ethylene and isobutane.

2. A hydrocarbon conversion process which comprises the steps of:

passing propylene through a disproportionation zone in contact with a disproportionation catalyst under conditions to disproportionate propylene, to produce a stream containing propylene, ethylene, and butene;

contacting isobutane in a first alkylation zone with the entire undivided effluent of said disproportionation zone and a first alkylation catalyst under conditions, including conditions of temperature and catalyst activity, to produce a first alkylation product of said propylene, said butene and said isobutane;

separating the effluent of said first alkylation zone into a first light stream comprising ethylene and unconverted isobutane and a first alkylate product stream comprising said first alkylate product;

passing the entire undivided first light stream into a second alkylation zone in contact with a second alkylation catalyst under conditions, including conditions of temperature and catalyst activity, to produce a second alkylation product of said ethylene and isobutane;

separating the effluent of said second alkylation zone into a second light stream comprising unconverted isobutane and a second alkylation product stream comprising said second alkylation product; and recycling said second light stream to at least one of said alkylation zones.

3. A hydrocarbon conversion process which comprises the steps of:

passing propylene through a disproportionation zone in contact with a disproportionation catalyst under conditions to disproportionate propylene, to produce a stream containing ethylene, propylene, and butene;

contacting isobutane in a first alkylation zone with at least a portion of undivided effluent of said disproportionation zone under conditions, including conditions of temperature and catalyst activity, to produce a first alkylation product of said propylene, said butene, and said isobutane; and passing at least a portion of undivided effluent of said first alkylation zone into a second alkylation zone under conditions, including conditions of temperature and catalyst activity, to produce a second alkylation product of said ethylene and isobutane.

4. A hydrocarbon conversion process which comprises the steps of:

passing propylene through a disproportionation zone in contact with a disproportionation catalyst under conditions to disproportionate propylene, to produce a stream containing propylene, ethylene, and butene;

contacting isobutane in a first alkylation zone with the entire undivided effluent of said disproportionation zone and a first alkylation catalyst under conditions, including conditions of temperature and catalyst activity, to produce a first alkylation product of said propylene, said butene and said isobutane;

contacting the entire undivided effluent of said first alkylation zone with a second alkylation catalyst under conditions, including conditions of temperature and catalyst activity, to produce a second alkylation product of said ethylene and isobutane;

separating the effluent of said second alkylation zone into a light stream comprising unconverted isobutane and an alkylation product stream comprising said first and second alkylation products; and recycling said light stream to at least one of said alkylation zones.

References Cited by the Examiner

UNITED STATES PATENTS

| | | | |
|---|---|---|---|
| 2,411,992 | 12/1946 | Grosse et al. | 260—683.44 |
| 2,438,852 | 3/1948 | Goldsby et al. | 260—683.44 X |
| 2,662,103 | 12/1953 | Matuszak | 260—683.48 |
| 2,906,795 | 9/1959 | Ballard et al. | 260—683.61 X |

DELBERT E. GANTZ, *Primary Examiner.*

ALPHONSO D. SULLIVAN, PAUL M. COUGHLAN,
*Examiners.*